US008014376B2

(12) United States Patent
Kim

(10) Patent No.: US 8,014,376 B2
(45) Date of Patent: Sep. 6, 2011

(54) MANAGING CHANNEL CONFIGURATION INFORMATION IN A WIRELESS COMMUNICATION SYSTEM

(75) Inventor: Myeong-Cheol Kim, Aachen (DE)

(73) Assignee: LG Electronics, Inc., Seoul (KR)

( * ) Notice: Subject to any disclaimer, the term of this patent is extended or adjusted under 35 U.S.C. 154(b) by 789 days.

(21) Appl. No.: 11/327,548

(22) Filed: Jan. 5, 2006

(65) Prior Publication Data

US 2006/0146858 A1     Jul. 6, 2006

Related U.S. Application Data

(60) Provisional application No. 60/641,499, filed on Jan. 5, 2005.

(51) Int. Cl.
*H04B 7/212* (2006.01)

(52) U.S. Cl. ......... 370/348; 370/335; 370/337; 370/312

(58) Field of Classification Search ........... 370/432, 370/335, 337, 338, 312, 348, 331, 349; 455/437
See application file for complete search history.

(56) References Cited

U.S. PATENT DOCUMENTS

| 6,717,925 | B1  |   | 4/2004  | Leppisaari et al. |        |
|-----------|-----|---|---------|-------------------|--------|
| 6,909,703 | B2  | * | 6/2005  | Terry et al.      | 370/328 |
| 6,961,571 | B1  | * | 11/2005 | Rune et al.       | 455/442 |
| 7,046,702 | B2  | * | 5/2006  | Sagne             | 370/538 |
| 7,177,658 | B2  | * | 2/2007  | Willenegger et al.| 455/522 |
| 7,180,885 | B2  | * | 2/2007  | Terry             | 370/312 |
| 7,197,333 | B2  | * | 3/2007  | Hwang et al.      | 455/560 |
| 7,203,512 | B2  | * | 4/2007  | Jeong et al.      | 455/522 |
| 7,315,509 | B2  | * | 1/2008  | Jeong et al.      | 370/216 |
| 7,373,148 | B2  | * | 5/2008  | Kim et al.        | 455/437 |
| 7,400,636 | B2  | * | 7/2008  | Kim et al.        | 370/401 |
| 7,403,502 | B2  | * | 7/2008  | Moon et al.       | 370/328 |
| 7,450,534 | B2  | * | 11/2008 | Kim et al.        | 370/312 |
| 7,493,108 | B2  | * | 2/2009  | Beming et al.     | 455/418 |

(Continued)

FOREIGN PATENT DOCUMENTS

EP      1148670 A1      11/2000

(Continued)

OTHER PUBLICATIONS

LG Electronics Inc., "MBMS General Issues", 3GPP TSG-RAN WG2#45, R2-050005, Oct. 15, 2005.

*Primary Examiner* — Ricky Ngo
*Assistant Examiner* — Dewanda Samuel
(74) *Attorney, Agent, or Firm* — Lee, Hong, Degerman, Kang & Waimey

(57) ABSTRACT

The present invention provides for managing channel configuration information in a wireless communication system. Preferably, the present invention receives transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service, determines whether to receive the at least one new point-to-multipoint service, and reads configuration information for the at least one new point-to-multipoint service at the start of the at least one new point-to-multipoint service if it is determined that the at least one new point-to-multipoint service is to be received.

14 Claims, 13 Drawing Sheets

U.S. PATENT DOCUMENTS

| | | |
|---|---|---|
| 7,499,435 B2 * | 3/2009 | Kwak et al. ............ 370/337 |
| 7,869,461 B2 * | 1/2011 | Lohr et al. ............ 370/469 |
| 2002/0181423 A1 * | 12/2002 | Chen et al. ............ 370/337 |
| 2003/0088695 A1 * | 5/2003 | Kwak et al. ............ 709/238 |
| 2003/0174678 A1 * | 9/2003 | Chang et al. ............ 370/335 |
| 2003/0194992 A1 * | 10/2003 | Kim et al. ............ 455/414.1 |
| 2003/0211855 A1 * | 11/2003 | Sarkkinen et al. ............ 455/466 |
| 2003/0223394 A1 * | 12/2003 | Parantainen et al. ............ 370/336 |
| 2004/0022218 A1 * | 2/2004 | Kim et al. ............ 370/335 |
| 2004/0097239 A1 | 5/2004 | Kim |
| 2004/0117860 A1 * | 6/2004 | Yi et al. ............ 725/147 |
| 2004/0180681 A1 * | 9/2004 | Jeong et al. ............ 455/503 |
| 2004/0184438 A1 * | 9/2004 | Terry ............ 370/349 |
| 2004/0202140 A1 | 10/2004 | Kim et al. |
| 2004/0228294 A1 * | 11/2004 | Kim et al. ............ 370/312 |
| 2005/0245260 A1 * | 11/2005 | Nielsen et al. ............ 455/435.1 |
| 2006/0018269 A1 * | 1/2006 | Agrawal et al. ............ 370/321 |
| 2006/0034205 A1 | 2/2006 | Kim |
| 2006/0154627 A1 * | 7/2006 | Wang et al. ............ 455/130 |
| 2006/0156370 A1 * | 7/2006 | Parantainen ............ 725/132 |

FOREIGN PATENT DOCUMENTS

| | | | |
|---|---|---|---|
| EP | 1467586 | * | 10/2004 |
| JP | 11-252104 | | 9/1999 |
| TW | 159308 | | 6/1991 |
| WO | 02080401 | | 10/2002 |
| WO | WO 03/039036 A1 | | 5/2003 |
| WO | 0355256 | | 7/2003 |
| WO | WO 03/055256 A | | 7/2003 |
| WO | WO 03/055256 A1 | | 7/2003 |
| WO | WO 03/100559 A2 | | 12/2003 |
| WO | 2004107794 | | 12/2004 |

* cited by examiner

MANAGING CHANNEL CONFIGURATION INFORMATION IN A WIRELESS COMMUNICATION SYSTEM

CROSS-REFERENCE TO RELATED APPLICATIONS

Pursuant to 35 U.S.C. § 119(e), this application claims the benefit of earlier filing date and right of priority to U.S. Provisional Application No. 60/641,499, filed on Jan. 5, 2005, the contents of which are hereby incorporated by reference herein in its entirety.

FIELD OF THE INVENTION

The present invention relates to a multimedia broadcast multicast service, and more particularly, to configuring transport resources for a service prior to its start.

BACKGROUND OF THE INVENTION

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a mobile terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200. The RNC 111 is connected to the Node-Bs via an Iub interface.

The Node-Bs 112, 113 receive information sent by the physical layer of the terminal through an uplink, and transmit data to the terminal through a downlink. The Node-Bs 112, 113, thus, operate as access points of the UTRAN 100 for the terminal. Each Node-B controls one or several cells, where a cell covers a given geographical area on a given frequency. Each RNC is connected via the Iu interface to the CN, i.e. towards the MSC (Mobile-services Switching Centre) entity of the CN and the SGSN (Serving GPRS Support Node) entity. RNCs can be connected to other RNCs via the Iur interface. The RNC handles the assignment and management of radio resources and operates as an access point with respect to the core network.

The Node-Bs receive information sent by the physical layer of the terminal through an uplink and transmit data to the terminal through a downlink. The Node-Bs operate as access points of the UTRAN for the terminal. The SGSN is connected via the Gf interface to the EIR (Equipment Identity Register), via the $G_S$ interface to the MSC, via the $G_N$ interface to the GGSN (Gateway GPRS Support Node) and via the $G_R$ interface to the HSS (Home Subscriber Server). The EIR hosts lists of mobile terminals which are allowed or are not allowed to be used on the network. The MSC, which controls the connection for CS services is connected via the $N_B$ interface towards the MGW (Media Gateway), via the F interface towards the EIR, and via the D interface towards the HSS. The MGW is connected via the C interface towards the HSS, and to the PSTN (Public Switched Telephone Network), and allows to adapt the codecs between the PSTN and the connected RAN.

The GGSN is connected via the $G_C$ interface to the HSS, and via the $G_I$ interface to the Internet. The GGSN is responsible for routing, charging and separation of data flows into different RABs. The HSS handles the subscription data of the users.

A primary function of the UTRAN 100 is forming and maintaining a radio access bearer (RAB) to allow communication between the terminal and the core network 200. The core network 200 requests end-to-end quality of service (QoS) requirements from the RAB, and the RAB supports the QoS requirements set by the core network 200. As the UTRAN 100 constructs and maintains the RAB, the end-to-end QoS requirements are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

(CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or "MBMS service") refers to a method of providing streaming or background services to a plurality of UEs using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

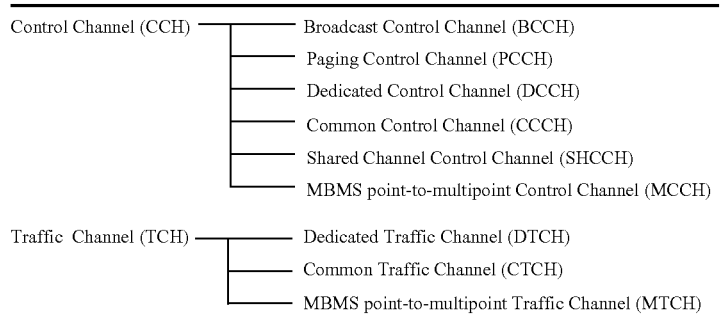

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel The MAC layer is connected to the physical layer by transport channels and can be divided into a MAC-b sub-layer, a MAC-d sub-layer, a MAC-c/sh sub-layer, a MAC-hs sub-layer and a MAC-m sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). The MAC-m sub-layer may handle the MBMS data. In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state, for example. Depending on the states, the UE listens to different channels. For example a UE in CELL_DCH state will try to listen (amongst others) to DCH type of transport channels, which comprises DTCH and DCCH transport channels, and which can be mapped to a certain DPCH, DPDSCH or other physical channel. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Generally, a UE in CELL_DCH state simultaneously exchanges data with different cells of NodeBs using a DPCCH (Dedicated Physical Control Channel). The different cells the UE is connected to, i.e., the cells to which the UE transmits to or receives from the DPCCH channel may belong to the same or different NodeBs. The different NodeBs may be connected to one RNC or to different RNCs. When a UE exchanges data with a cell in CELL_DCH state, the UE is said to have a radio link towards a cell. When the UE has radio links to several NodeBs, the UE is said to be in "soft handover". When the UE has radio links to several cells on the same NodeB, the UE is said to be in "softer handover". The set of all radio links the UE uses is called the "active set" of the UE. The UE may receive information on the neighboring cells via signaling messages to evaluate cell quality and report this information to the RNC. The RNC may then use this information to update the list of cells in the active set of the UE.

Main system information is sent on the BCCH logical channel, which is mapped on the P-CCPCH (Primary Common Control Physical Channel). Specific system information blocks can be sent on the FACH channel. When the system information is sent on the FACH, the UE receives the configuration of the FACH either on the BCCH that is received on the P-CCPCH or on a dedicated channel. The P-CCPCH is sent using the same scrambling code as a P-CPICH (Primary Common Pilot Channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor, the number of orthogonal codes is equal to the length of the code. For each spreading factor, the given set of orthogonal codes, as specified in the UMTS system, are numbered from 0 to SF-1. Each code can thus be identified by giving its length (i.e. spreading factor) and the number of the code. The spreading code that is used by the P-CCPCH is always of a fixed spreading factor 256 and the number is the number 0. The UE knows about the primary scrambling code either by information sent from the network on system information of neighboring cells that the UE has read, by messages that the UE has received on the DCCH channel, or by searching for the P-CPICH, which is sent using the fixed SF 256 and the spreading code number 0, and which transmits a fixed pattern.

The system information comprises information on neighboring cells, configuration of the RACH and FACH transport channels, and the configuration of MCCH, which is a channel used for MBMS service. When the UE has selected a cell (in CELL_FACH, CELL_PCH or URA_PCH state), the UE verifies that it has valid system information.

The system information is organized in SIBs (system information blocks), a MIB (Master information block) and scheduling blocks. The MIB is sent very frequently and provides timing information of the scheduling blocks and the different SIBs. For SIBs that are linked to a value tag, the MIB also contains information on the last version of a part of the SIBs. SIBs that are not linked to a value tag are linked to an expiration timer. The SIBs linked to an expiration timer become invalid and need to be reread if the time of the last reading of the SIB is larger than an expiration timer value. The SIBs linked to a value tag are only valid if they have the same value tag as a value tag broadcast in the MIB. Each block has an area scope of validity, such as a Cell, a PLMN (Public Land Mobile Network) or an equivalent PLMN, which signifies on which cells the SIB is valid. A SIB with the area scope "Cell" is valid only for the cell in which it has been read. A SIB with the area scope "PLMN" is valid in the whole PLMN. A SIB with the area scope "equivalent PLMN" is valid in the whole PLMN and equivalent PLMN.

In general, UEs read the system information when they are in idle mode, CELL_FACH state, CELL_PCH state or in URA_PCH state of the cell that they have selected, i.e., the cell that they are camping on. In the system information, the UEs receive information on the neighboring cells on the same frequency, different frequencies and different RAT (Radio access technologies). This allows the UEs to know which cells are candidates for cell reselection.

In CELL_DCH state, the UE already listens to different radio links the UE is using. Accordingly, it increases complexity for the UE to additionally read BCCH channels. Therefore, the UE generally receives information on neighboring cells in a dedicated message from the RNC, and only for some very specific functions. However, it is possible that UEs read system information sent on the P-CCPCH channel or other transport channels while in CELL_DCH state.

The 3GPP system can provide multimedia broadcast multicast service (MBMS). The 3GPP TSG SA (Service and System Aspect) defines various network elements and their functions required for supporting MBMS services. A cell broadcast service provided by the prior art is limited to a service in which text type short messages are broadcast to a certain area. The MBMS service, however, is a more advanced service that multicasts multimedia data to terminals (UEs) that have subscribed to the corresponding service in addition to broadcasting multimedia data.

The MBMS service is a downward service that provides a streaming or background service to a plurality of terminals by using a common or dedicated downward channel. The MBMS service is divided into a broadcast mode and a multicast mode. The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 6 illustrates a process of providing a particular MBMS service, by using the multicast mode. The procedure can be split into two types of actions, those that are transparent and those that are not transparent to the UTRAN.

The transparent actions are described in the following. A user desiring to receive the MBMS service, first needs to subscribe in order to be allowed to receive MBMS services, to receive information on MBMS services, and to join a certain set of MBMS services. A service announcement provides the terminal with a list of services to be provided and other related information. The user can then join these services. By joining, the user indicates that the user wants to receive information linked to services that the user has subscribed to and becomes part of a multicast service group. When a user is no longer interested in a given MBMS service, the user leaves the service, i.e., the user is no longer part of the multicast service group. These actions can be taken by using any means of communication, i.e., the actions may be done using SMS (Short Messaging Service), or by Internet access. These actions do not have to necessarily be done using the UMTS system.

In order to receive a service for which the user is in a multicast group the following actions that are not transparent to the UTRAN are executed. The SGSN informs the RNC about a session start. Then the RNC notifies the UEs of the multicast group that a given service has started in order to initiate reception of the given service. After having broadcast the necessary UE actions and eventually the configuration of the PtM bearers for the given service the transmission of the data starts. When the session stops, the SGSN indicates the stopped session to the RNC. The RNC in turn initiates a session stop. The transmission of the service from the SGSN means for the RNC to provide a bearer service for conveying the data of the MBMS service.

After the notification procedure, other procedures can be initiated between the UE and the RNC and the SGSN to enable data transmission, such as RRC connection establishment, connection establishment towards the PS domain, frequency layer convergence, and counting.

Reception of an MBMS service may be performed in parallel to the reception of other services, such as a voice or video call on the CS domain, SMS transfer on the CS or PS domain, data transfer on the PS domain, or any signaling related to the UTRAN or PS or CS domain.

Contrary to the multicast service, for broadcast services, as shown in FIG. 7, only the announcement of the service must be done in a transparent manner. No subscription or joining is needed. Afterwards, the actions that are transparent to the RNC are the same as for multicast services.

Referring to FIG. 8, a typical session sequence from a UTRAN perspective is illustrated. As shown, the SGSN informs the RNC about a session start (step 1). The RNC may then perform a counting procedure, which triggers some UEs to establish a connection to the PS domain (step 2). Consequently, the establishment of an RRC connection for the UEs is initiated. This allows the RNC to estimate the number of UEs in a given cell that are interested in the service. When the UE has established the PS connection, the SGSN initiates the Iu linking procedure, which provides the list of multicast services the UE has joined to the RNC.

For UEs that have an RRC connection established, and which are interested in the given MBMS service but are not connected to the PS domain, the RNC sends a specific message to the UEs triggering them to establish a PS connection (step 3). When the UE has established the PS connection, the SGSN initiates the Iu linking procedure, which provides the list of multicast services the UE has joined to the RNC. For UEs that are not in a CELL_DCH state, a frequency layer convergence scheme allows the RNC to trigger the UEs to change the frequency to which they listen (step 4).

Depending on the Radio Resource Management (RRM) scheme, the RNC establishes point-to-multipoint (PtM) or point-to-point (PtP) radio bearers for delivering the MBMS service (step 5a or 5b). The RNC delivers data received from the SGSN to the UEs that are part of the multicast group. After the transmission of the data, the SGSN informs the RNC about the end of the sessions (step 6). The RNC then releases the PtP or PtM radio bearers used for transmitting the MBMS data (step 7a or 7b).

Generally, for UEs in an RRC connected state, two possibilities exist. The UE will either have a connection established with the PS domain (PMM connected) or the UE will have no connection established with the PS domain (PMM idle mode). When there is no connection established with the PS domain, the UE will normally have a connection with the CS domain. Otherwise, the UE is not in an RRC connected mode.

SUMMARY OF THE INVENTION

The present invention is directed to managing channel configuration information in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for managing channel configuration information in a wireless communication system, the method comprising receiving transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service, determining whether to receive the at least one new point-to-multipoint service, and reading configuration information for the at least one new point-to-multipoint service at the start of the at least one new point-to-multipoint service if it is determined that the at least one new point-to-multipoint service is to be received.

In one aspect of the invention, the method further comprises reading the configuration information for the at least one new point-to-multipoint service before the stop of the at least one new point-to-multipoint service if it is determined that the at least one new point-to-multipoint service is to be received. Preferably, the configuration information for the at least one new point-to-multipoint service is not read if it is determined that the at least one new point-to-multipoint service is not to be received.

In another aspect of the invention, the method further comprises receiving physical channel configuration information for receiving at least one point-to-multipoint service, wherein the physical channel configuration information comprises at least one of the transport channel configuration information, MAC configuration information, RLC configuration information and PDCP configuration information.

In a further aspect of the invention, the method further comprises receiving transport channel configuration information for configuring at least one transport channel currently mapping at least one point-to-multipoint service.

Preferably, the point-to-multipoint service is a multimedia broadcast multicast service (MBMS). Preferably, the transport channel is capable of multiplexing a plurality of point-to-multipoint services. Preferably, the at least one new point-to-multipoint service is determined to be received before the start of the at least one new point-to-multipoint service.

In accordance with another embodiment of the present invention, a method for managing channel configuration information in a wireless communication system comprises receiving transport channel configuration information for configuring a transport channel for mapping at least one point-to-multipoint service, receiving in the transport channel configuration information a header indicator for indicating use of a header for multiplexing a plurality of point-to-multipoint services onto the transport channel, determining whether to receive a new point-to-multipoint service to be mapped onto the transport channel, and reading a new header for identifying the new point-to-multipoint service to be mapped onto the transport channel at the start of the new point-to-multipoint service if it is determined that the new point-to-multipoint service is to be received.

In one aspect of the invention, the method further comprises reading the new header for identifying the new point-to-multipoint service before the stop of the new point-tomultipoint service if it is determined that the new point-to-multipoint service is to be received. Preferably, the new header for identifying the new point-to-multipoint service is not read if it is determined that the new point-to-multipoint service is not to be received.

In another aspect of the invention, the method further comprises receiving physical channel configuration information for receiving at least one point-to-multipoint service, wherein the physical channel configuration information comprises at least one of the transport channel configuration information, MAC configuration information, RLC configuration information and PDCP configuration information.

Preferably, the transport channel currently maps no more than one point-to-multipoint service. Preferably, the transport channel is capable of mapping the new point-to-multipoint service at the start or before the stop of the new point-to-multipoint service. Preferably, the point-to-multipoint service is a multimedia broadcast multicast service (MBMS). Preferably, the new point-to-multipoint service is determined to be received before the start of the new point-to-multipoint service.

In accordance with another embodiment of the present invention, a method for managing channel configuration information in a wireless communication system comprises transmitting to a mobile terminal transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service, and transmitting the at least one new point-to-multipoint service according to the transmitted transport channel configuration information, wherein the mobile terminal reads the configuration information for the at least one new point-to-multipoint service at the start of the at least one new point-to-multipoint service if the mobile terminal determines to receive the at least one new point-to-multipoint service.

In one aspect of the invention, the mobile terminal reads the configuration information for the at least one new point-to-multipoint service before the stop of the at least one new point-to-multipoint service if the mobile terminal determines to receive the at least one new point-to-multipoint service. Preferably, the mobile terminal does not read the configuration information for the at least one new point-to-multipoint service if the mobile terminal determines not to receive the at least one new point-to-multipoint service.

In another aspect of the invention, the method further comprises transmitting to the mobile terminal physical channel configuration information for transmitting at least one point-to-multipoint service, wherein the physical channel configuration information comprises at least one of the transport channel configuration information, MAC configuration information, RLC configuration information and PDCP configuration information.

In a further aspect of the invention, the method further comprises transmitting transport channel configuration information for configuring at least one transport channel currently mapping at least one point-to-multipoint service.

Preferably, the point-to-multipoint service is a multimedia broadcast multicast service (MBMS). Preferably, the transport channel is capable of multiplexing a plurality of point-to-multipoint services. Preferably, the mobile terminal determines whether to receive the at least one new point-to-multipoint service before the start of the at least one new point-to-multipoint service.

In accordance with another embodiment of the present invention, a method for managing channel configuration information in a wireless communication system comprises transmitting transport channel configuration information for configuring a transport channel for mapping at least one point-to-multipoint service, transmitting in the transport channel configuration information a header indicator for indicating use of a header for multiplexing a plurality of point-to-multipoint services onto the transport channel, transmitting a new header for identifying a new point-to-multipoint service to be mapped onto the transport channel, and transmitting the new point-to-multipoint service according to the transmitted new header, wherein the mobile terminal reads the new header at the start of the new point-to-multipoint service if the mobile terminal determines to receive the new point-to-multipoint service.

In one aspect of the invention, the mobile terminal reads the new header for the new point-to-multipoint service before the stop of the new point-to-multipoint service if the mobile terminal determines to receive the new point-to-multipoint service. Preferably, the mobile terminal does not read the new header if the mobile terminal determines not to receive the new point-to-multipoint service.

In another aspect of the invention, the method further comprises transmitting physical channel configuration information for transmitting at least one point-to-multipoint service, wherein the physical channel configuration information comprises at least one of the transport channel configuration information, MAC configuration information, RLC configuration information and PDCP configuration information.

Preferably, the transport channel currently maps no more than one point-to-multipoint service. Preferably, the transport channel is capable of mapping the new point-to-multipoint service at the start or before the stop of the new point-to-multipoint service. Preferably, the point-to-multipoint service is a multimedia broadcast multicast service (MBMS). Preferably, the mobile terminal determines whether to receive the new point-to-multipoint service before the start of the new point-to-multipoint service.

In accordance with another embodiment of the present invention, a mobile terminal for managing channel configuration information in a wireless communication system comprises means for receiving transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service, means for determining whether to receive the at least one new point-to-multipoint service, and means for reading configuration information for the at least one new point-to-multipoint service at the start of the at least one new point-to-multipoint service if it is determined that the at least one new point-to-multipoint service is to be received.

In one aspect of the invention, the mobile terminal further comprises means for reading the configuration information for the at least one new point-to-multipoint service before the stop of the at least one new point-to-multipoint service if it is determined that the at least one new point-to-multipoint service is to be received. Preferably, the configuration information for the at least one new point-to-multipoint service is not read if it is determined that the at least one new point-to-multipoint service is not to be received.

In another aspect of the invention, the mobile terminal further comprises means for receiving physical channel configuration information for receiving at least one point-to-multipoint service, wherein the physical channel configuration information comprises at least one of the transport channel configuration information, MAC configuration information, RLC configuration information and PDCP configuration information.

In a further aspect of the invention, the mobile terminal further comprises means for receiving transport channel configuration information for configuring at least one transport channel currently mapping at least one point-to-multipoint service.

Preferably, the point-to-multipoint service is a multimedia broadcast multicast service (MBMS). Preferably, the transport channel is capable of multiplexing a plurality of point-to-multipoint services. Preferably, the at least one new point-to-multipoint service is determined to be received before the start of the at least one new point-to-multipoint service.

In accordance with another embodiment of the present invention, a mobile terminal for managing channel configuration information in a wireless communication system comprises means for receiving transport channel configuration information for configuring a transport channel for mapping at least one point-to-multipoint service, means for receiving in the transport channel configuration information a header indicator for indicating use of a header for multiplexing a plurality of point-to-multipoint services onto the transport channel, means for determining whether to receive a new point-to-multipoint service to be mapped onto the transport channel, and means for reading a new header for identifying the new point-to-multipoint service to be mapped onto the transport channel at the start of the new point-to-multipoint service if it is determined that the new point-to-multipoint service is to be received.

In one aspect of the invention, the mobile terminal further comprises means for reading the new header for identifying the new point-to-multipoint service before the stop of the new point-to-multipoint service if it is determined that the new point-to-multipoint service is to be received. Preferably, the new header for identifying the new point-to-multipoint service is not read if it is determined that the new point-to-multipoint service is not to be received.

In another aspect of the present invention, the mobile terminal further comprises means for receiving physical channel configuration information for receiving at least one point-to-multipoint service, wherein the physical channel configuration information comprises at least one of the transport channel configuration information, MAC configuration information, RLC configuration information and PDCP configuration information.

Preferably, the transport channel currently maps no more than one point-to-multipoint service. Preferably, the transport channel is capable of mapping the new point-to-multipoint service at the start or before the stop of the new point-to-multipoint service. Preferably, the point-to-multipoint service is a multimedia broadcast multicast service (MBMS). Preferably, the new point-to-multipoint service is determined to be received before the start of the new point-to-multipoint service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
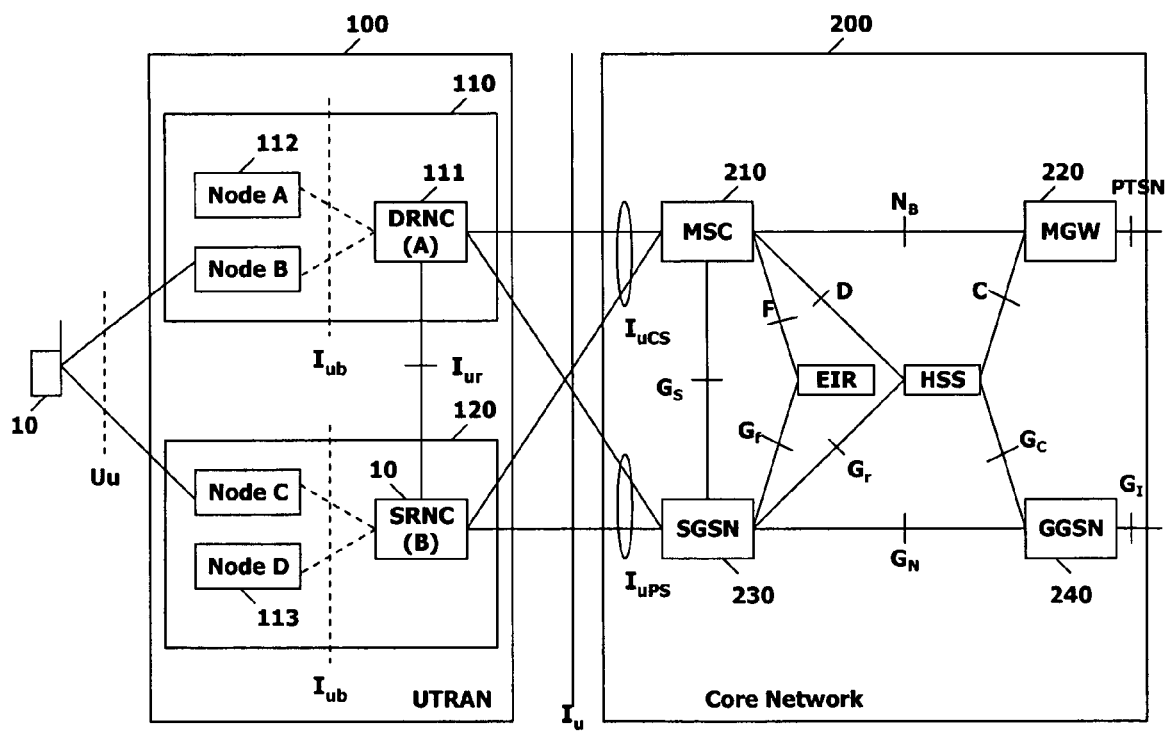
FIG. 1 is a block diagram of a general UMTS network architecture.
Figure 2:
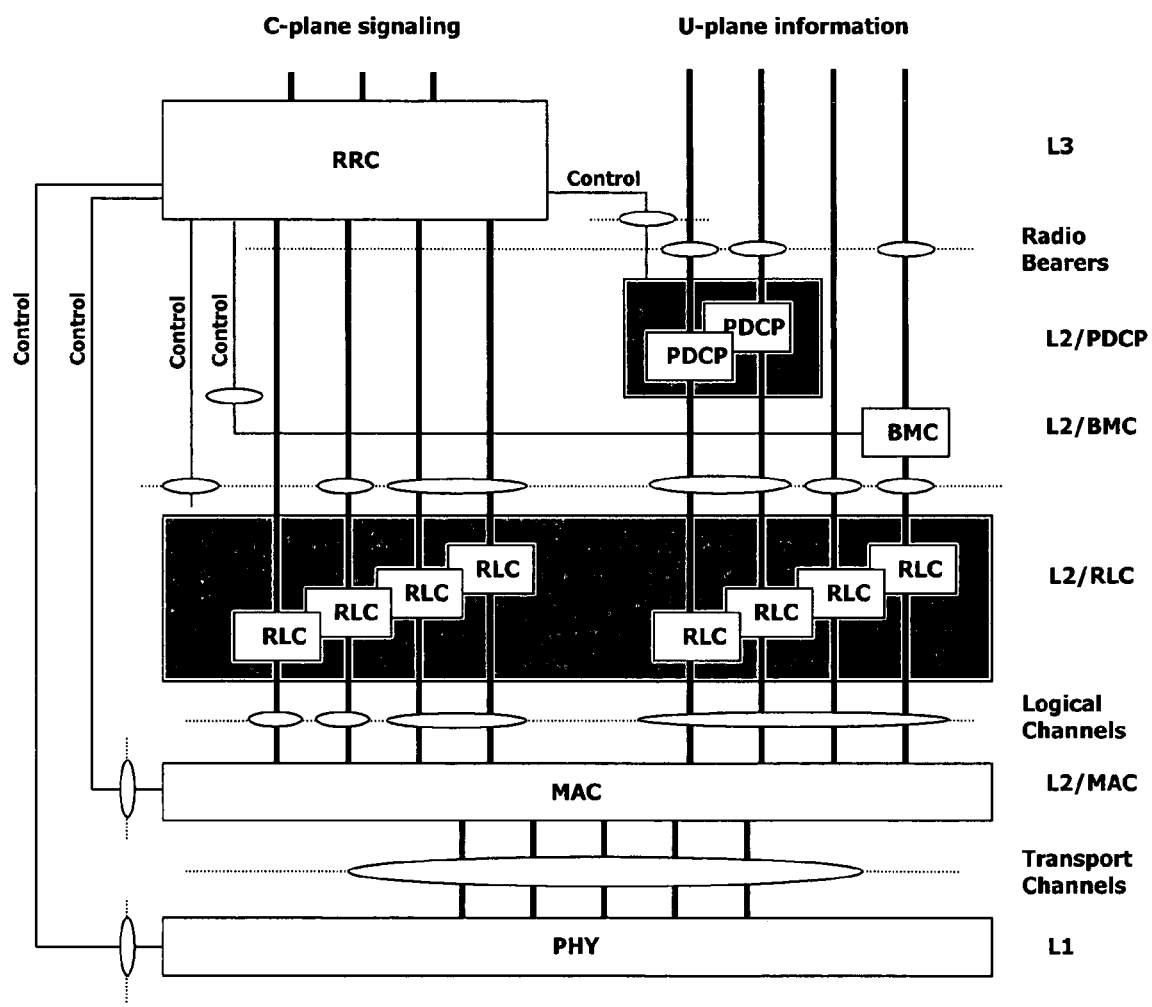
FIG. 2 is a block diagram of a structure of a radio interface protocol between a terminal and a network based on 3GPP radio access network standards.
Figure 3:
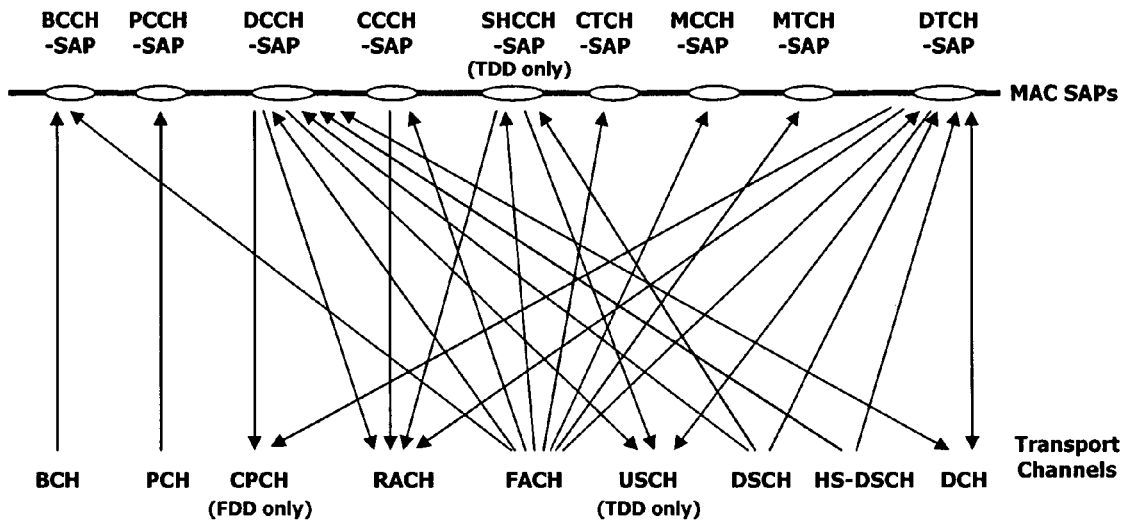
FIG. 3 illustrates the mapping of logical channels onto transport channels in the mobile terminal.
Figure 4:
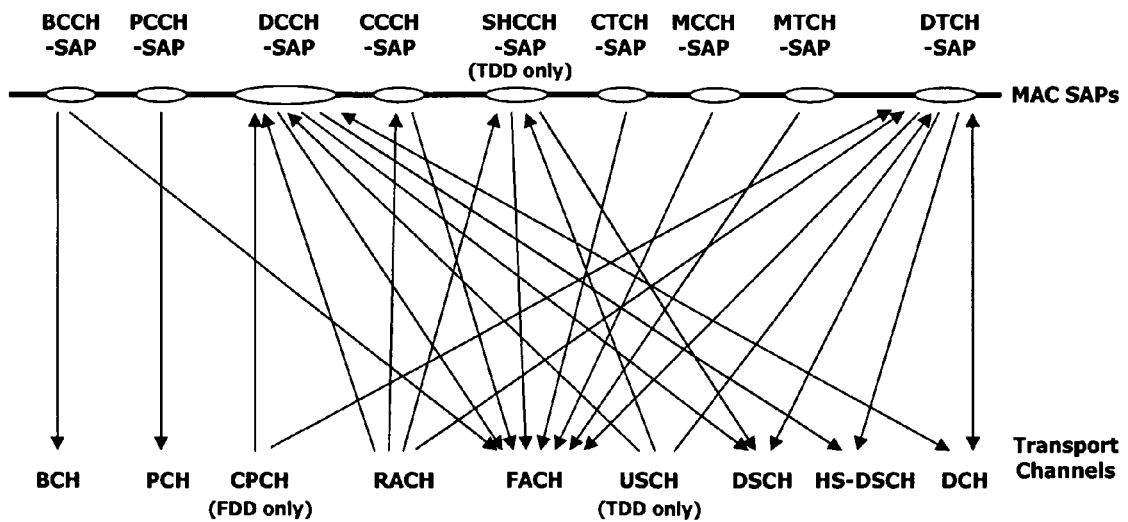
FIG. 4 illustrates the mapping of logical channels onto transport channels in the network.
Figure 5:
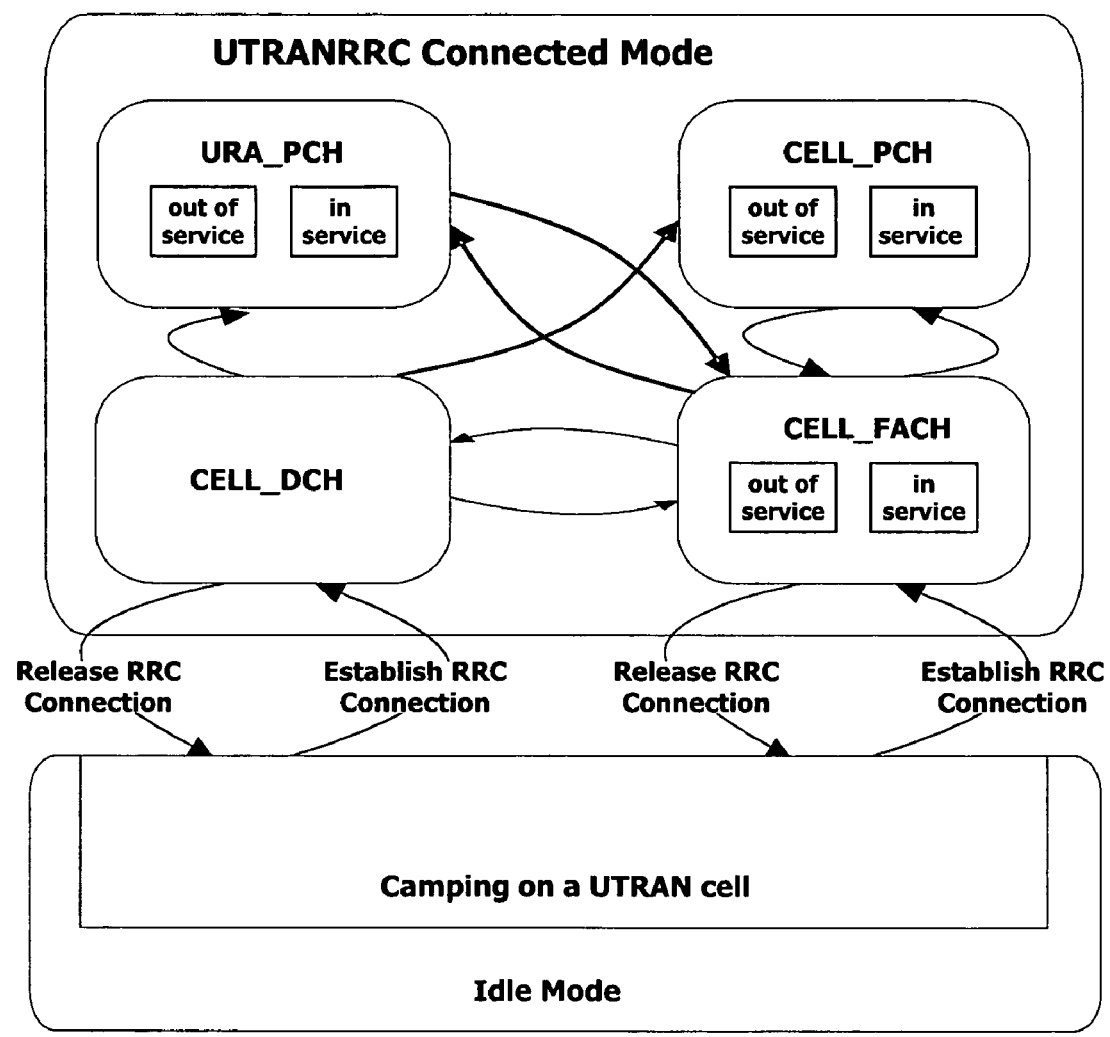
FIG. 5 illustrates possible transitions between modes and states in the UMTS network.
Figure 6:
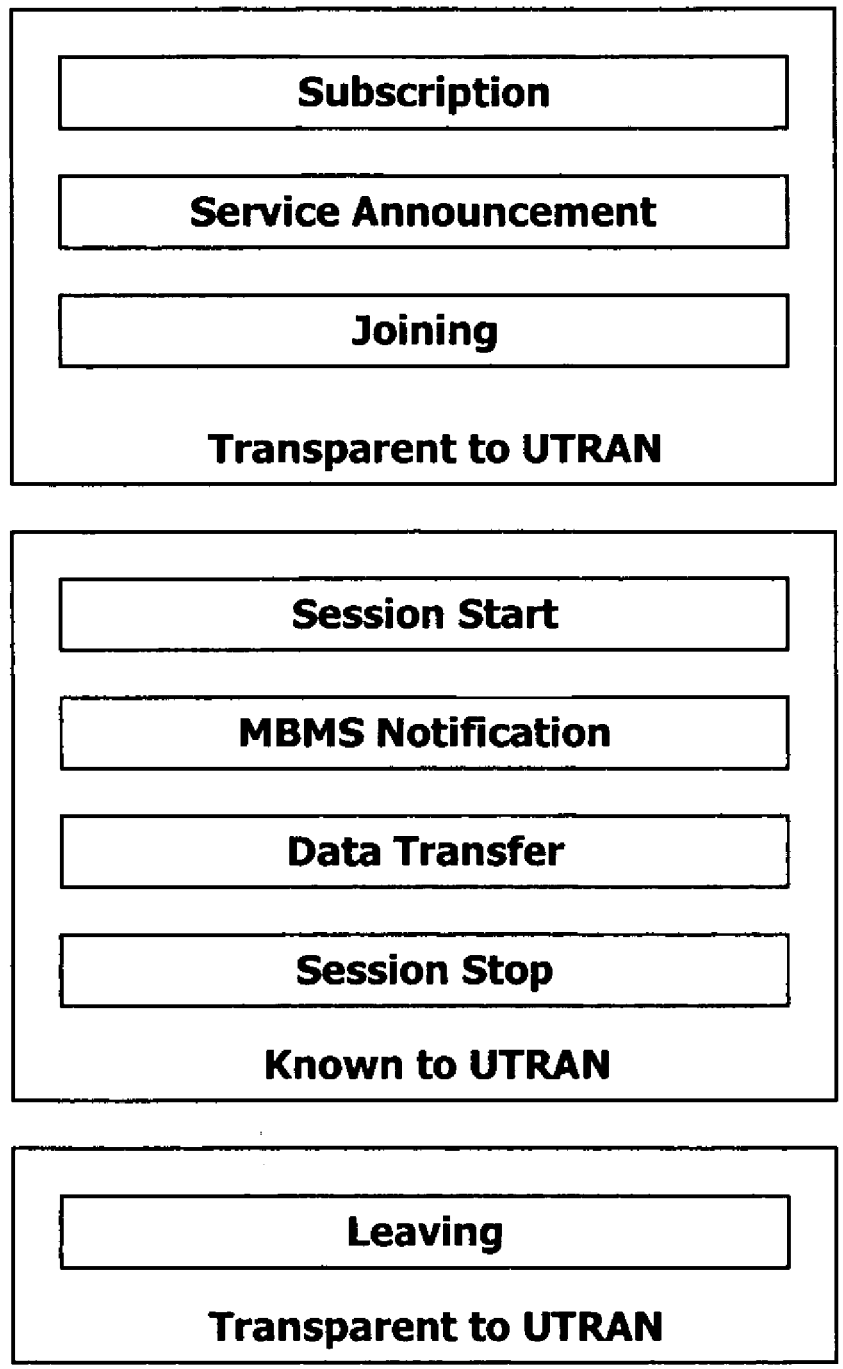
FIG. 6 illustrates a process of providing a particular point-to-multipoint service using a multicast mode.
Figure 7:
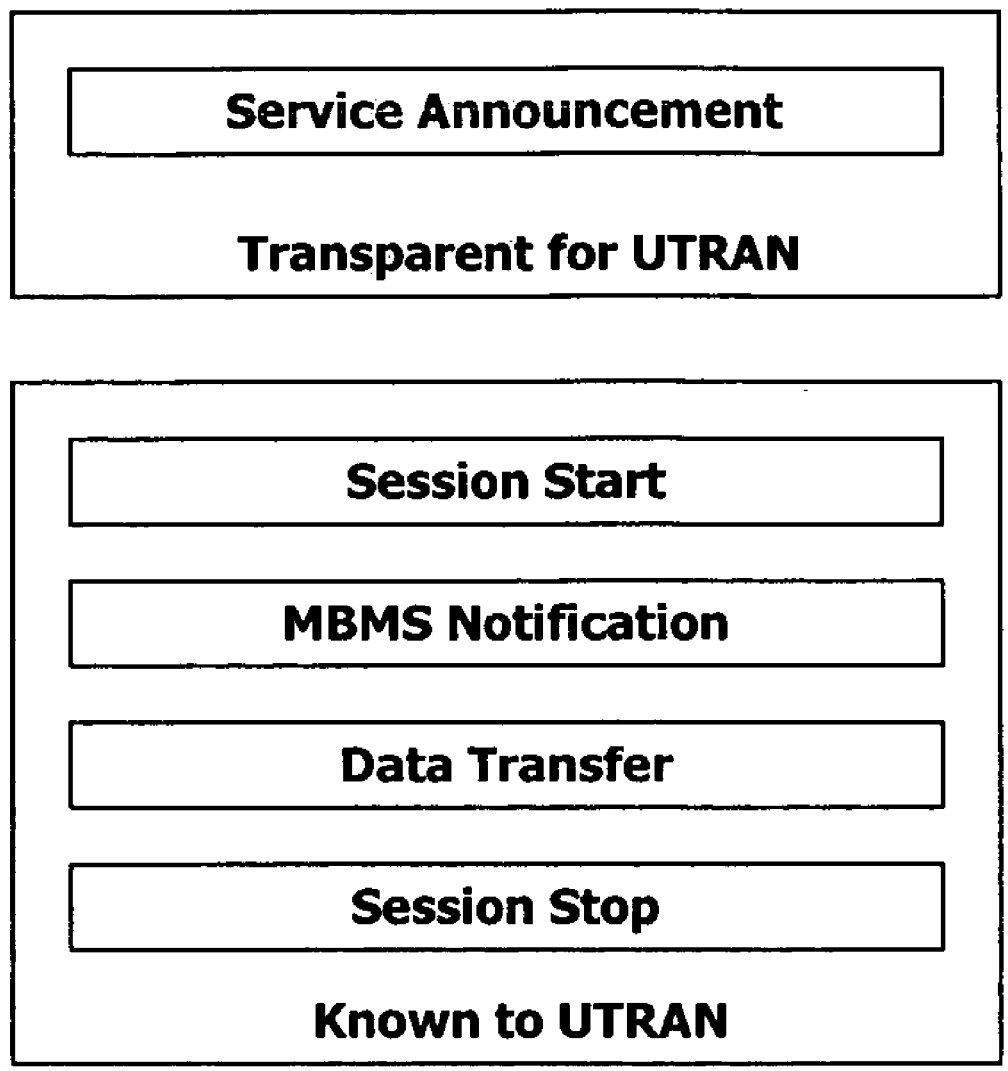
FIG. 7 illustrates a process of providing broadcast services.
Figure 8:
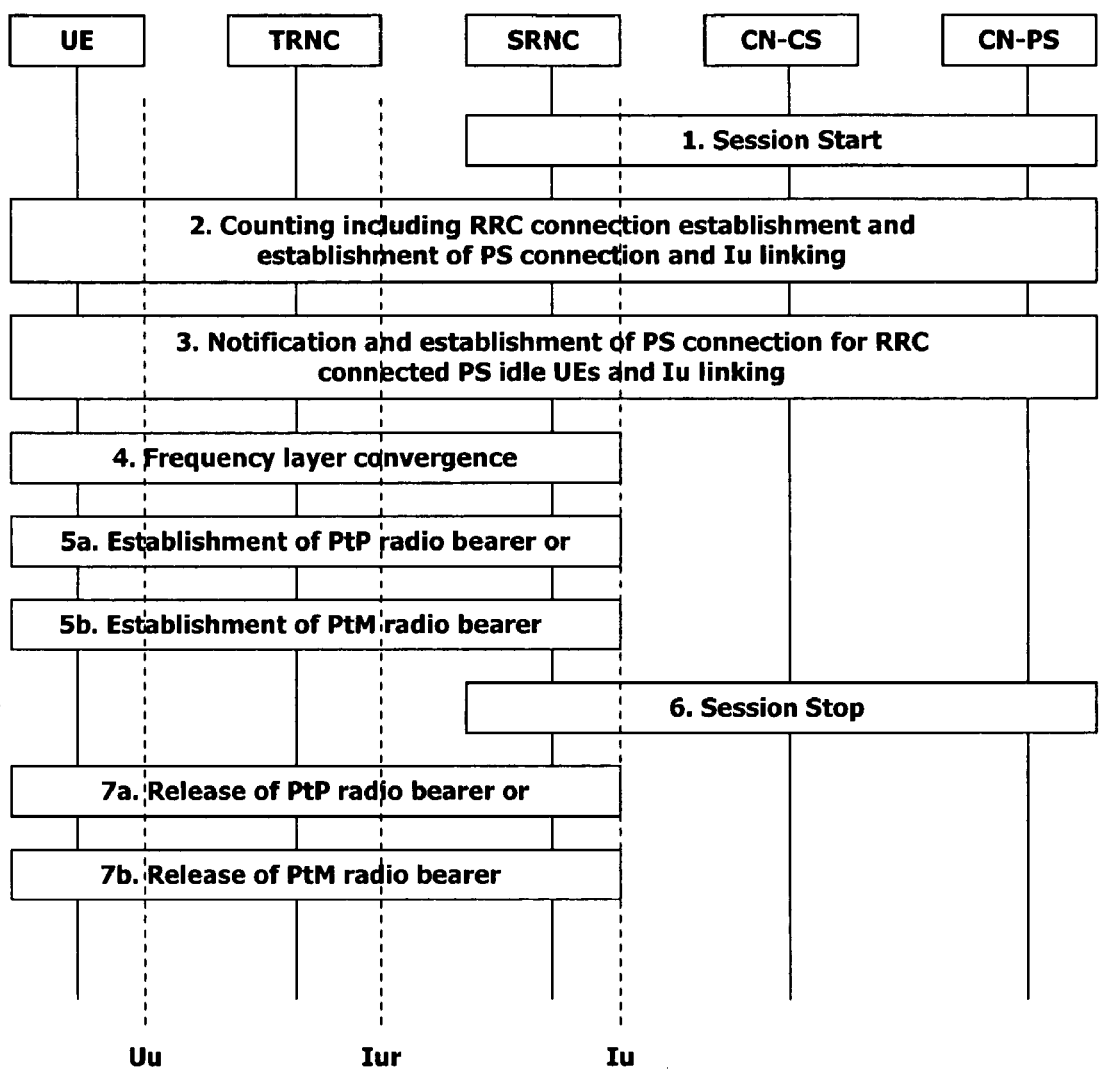
FIG. 8 illustrates a session sequence from a network perspective.

The present invention relates to a multimedia broadcast multicast system, and more particularly, to including configuration information of transport channels on which no service is mapped in a physical channel configuration sent to a UE, such that at the start of new services using such transport channel configurations, only the UEs interested in the new services need to read configuration information related to the new services.

The present invention also relates to the presence of a MAC header, used for multiplexing different services onto the same transport channel, being controllable via explicit signaling, such that the MAC header is included in a physical channel configuration sent to the UE when it is foreseen that the same transport channel can be shared between different services.

For MBMS, two additional control channels are introduced. They are the MCCH and the MICH (MBMS Notification Indicator Channel). As explained above, the MCCH is mapped on the FACH. The MICH is a physical channel and is used to notify users to read the MCCH channel. The MICH is designed to allow the UEs to perform a DRX (Discontinuous Reception) scheme. DRX allows the reduction of battery consumption for UEs while allowing the UEs to still be aware of any service for which a session is starting. The MICH may be used to inform the UE of a change in a frequency convergence scheme, change of a configuration of a point-to-multipoint (PtM) bearer, switch between the PtM bearer and a point-to-point (PtP) bearer, etc., which all require the MCCH to be read.

The MCCH channel periodically transmits information regarding active services, MTCH configuration, frequency convergence, etc. The UE reads the MCCH information to receive the subscribed services based on different triggers. For example, the UE may be triggered after cell selection/reselection, when the UE is notified of a given service on the MICH, or when the UE is notified via the DCCH channel. The configuration of the MCCH channel is broadcast in the system information. The MICH configuration (i.e. spreading code, scrambling code, spreading factor and other information) is either fixed in the standard, given in the system information or broadcast on the MCCH.

The MCCH information is transmitted based on a fixed schedule. The schedule identifies a transmission time interval (TTI) containing the beginning of the MCCH information. The transmission of the information may take a variable number of TTIs. The UTRAN transmits the MCCH information in consecutive TTIs. The mobile terminal (UE) continues to receive the SCCPCH until: 1) the UE receives all of the MCCH information; 2) the UE receives a TTI that does not include any MCCH data; or 3) the information contents indicate that further reception is not required (e.g. there is no modification to the desired service information).

Based on this behavior, the UTRAN may repeat the MCCH information following a scheduled transmission in order to improve reliability. The MCCH schedule is common for all services. The entire MCCH information is transmitted periodically based on a "repetition period". A "modification period" is defined as an integer multiple of the repetition period. The MBMS ACCESS INFORMATION may be transmitted periodically based on an "access info period". This period is an integer divider of the "repetition period".

MCCH information may be categorized as critical and non-critical information. The critical information is made up of MBMS COMMON P-T-M RB INFORMATION, MBMS CURRENT CELL P-T-M RB INFORMATION, MBMS GENERAL INFORMATION, MBMS MODIFIED SERVICES INFORMATION, MBMS NEIGHBORING CELL P-T-M RB INFORMATION, MBMS SCHEDULING INFORMATION and MBMS UNMODIFIED SERVICES INFORMATION. The non-critical information corresponds to the MBMS ACCESS INFORMATION.

Figure 9:
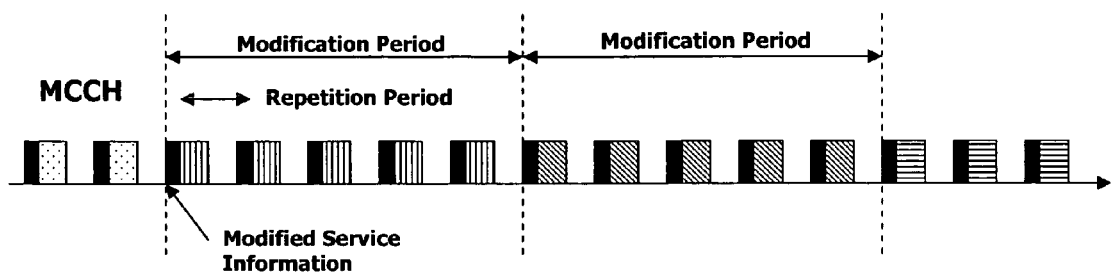
FIG. 9 illustrates a schedule for transmitting information on an MCCH.

Changes to critical information are only applied at the first MCCH transmission of a modification period. At the beginning of each modification period, the UTRAN transmits the MBMS CHANGE INFORMATION including, amongst others, information on MBMS services whose MCCH information is modified at that modification period. MBMS CHANGE INFORMATION is repeated at least once in each repetition period of that modification period. Changes to non-critical information may take place at any time. FIG. 9 illustrates a schedule with which the MBMS CHANGE INFORMATION and RADIO BEARER INFORMATION sent on MCCH are transmitted. Different patterned blocks indicate potentially different MCCH content.

An MBMS notification mechanism is used to inform UEs of an upcoming change in critical MCCH information. Notifications are based on service groups. The mapping between service IDs and service groups is based on a hashing mechanism. MBMS notification indicators are sent on an MBMS specific PICH, called the MICH. A single MICH frame is able to carry indications for every service-group.

Critical MCCH information can only be changed at the beginning of a modification period. The MBMS notification indicator corresponding to the service group of every affected service is set continuously during the entire modification period preceding the first change in MCCH information related to a given service. Subsequent changes in the MCCH information in the next modification period related to the same service can be signaled on the MCCH. UEs which are not receiving any MBMS service on MTCH or p-t-p channel are free to read the MBMS notification at any time.

Upon detecting the MBMS notification indication for a service group, UEs interested in a service corresponding to this group start reading the MCCH at the beginning of the next modification period. The UE reads at least MBMS Modified Services Information.

Figure 10:
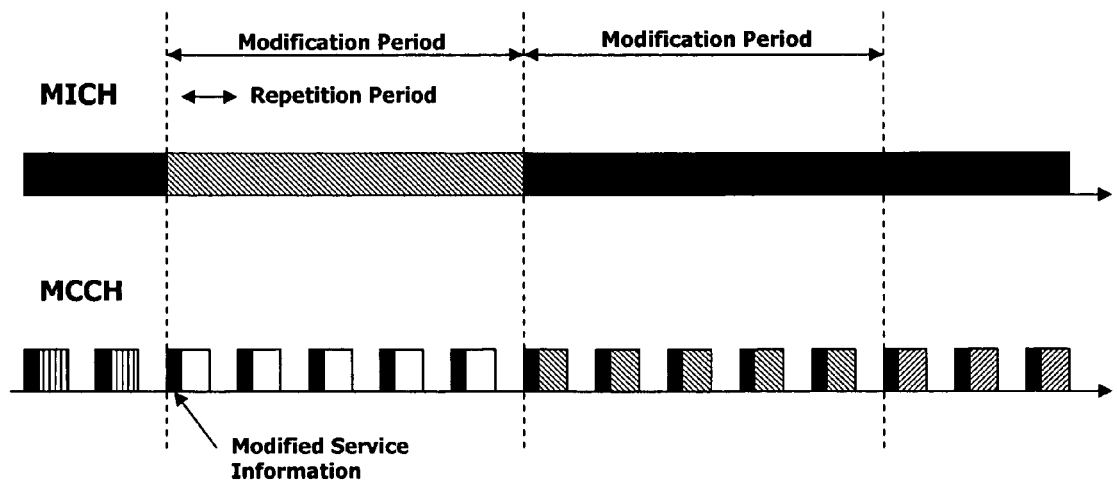
FIG. 10 illustrates a schedule wherein notification for reading MCCH during a modification period is sent on MICH during a previous modification period.

FIG. 10 illustrates the timing relation between the setting of the MICH and the first MCCH critical information change. A diagonal line-patterned block for the MICH indicates when the NI is set for the service. For the MCCH, different patterned blocks indicate MCCH content related to the notification of different services.

UEs, which are receiving MBMS service(s) on MTCH in idle mode or in a URA_PCH, CELL_PCH, or CELL_FACH state read the MCCH at the beginning of each modification period to receive the MBMS Modified Services Information. The MBMS Modified Services Information indicates MBMS service Ids and optionally an MBMS Session ID whose MCCH information is modified at that modification period. If the MBMS service Id, and optionally, the MBMS Session ID, which the UE has activated, is indicated in the MBMS Modified Services Information, the UE shall read the rest of the MCCH information.

When a UE in CELL_FACH state wants to receive a PtM radio bearer, the UE first needs to receive the system information on the BCCH channel, which is sent on the P-CCPCH channel, to know the MCCH configuration of the cell the UE has selected. Therefore, the UE must know the primary scrambling code. Once the UE knows the MCCH channel, the UE then reads the MCCH channel to obtain configuration information of the PtM radio bearers. To obtain a first starting cell, the UE may receive the primary scrambling code of the cell by dedicated messages. The UE may also perform a cell search or read stored information. Alternatively, for a UE that has already selected or camped on a cell, the UE may use information regarding neighboring cells found in the system information of the cell the UE has already selected.

Figure 11:
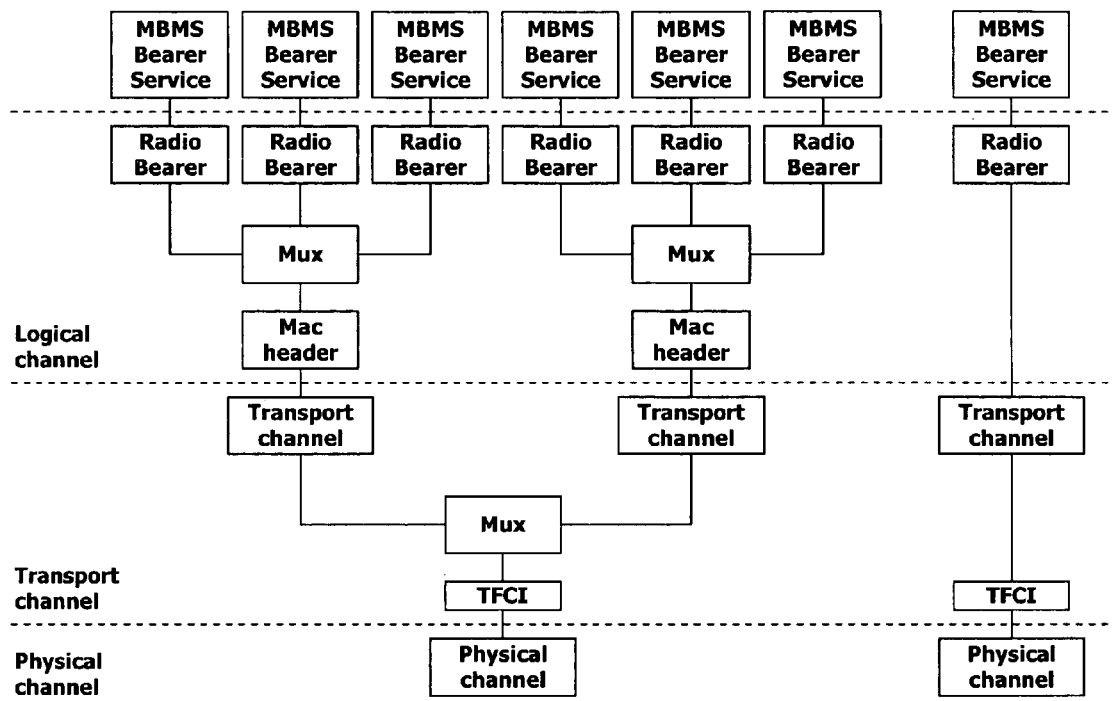
FIG. 11 illustrates mapping of MBMS bearer services, radio bearers, transport channel and physical channels.

Referring to FIG. 11, for MBMS, different MBMS bearer services are mapped to different radio bearers. As shown, this is possible on different levels, e.g. by using MAC multiplexing or transport channel multiplexing. In order to receive a service, it is necessary that the receiver know the configuration of the physical channels, the transport channels and the logical channels/services in case the configuration is changed due to new services being multiplexed on the same physical/transport channel. Accordingly, the new services may potentially impact the reception of the already ongoing services.

The MAC layer allows different logical channels (i.e. different radio bearers) to be multiplexed onto the same transport channel. The MAC layer further controls access to the physical channels, i.e. decides on the transport format combination.

When different radio bearers/logical channels are multiplexed onto one transport channel, a MAC header carrying an identity of the MBMS service is added to distinguish the origin of the packet. Presence or absence of the MAC header normally impacts the size of the transport block size, and therefore the configuration of the transport formats.

Figure 12:
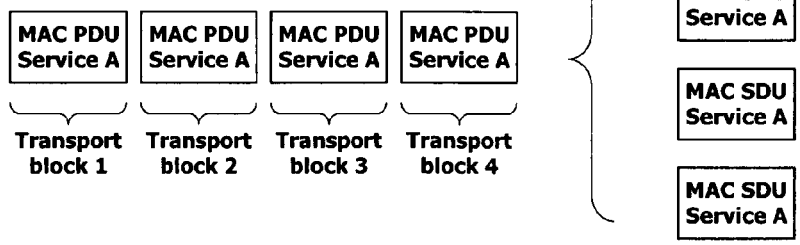
FIG. 12 illustrates a case wherein only packets from the same logical channel are multiplexed onto the same transport channel.

FIG. 12 illustrates a case where only packets from the same logical channel are multiplexed onto a transport channel. Accordingly, it is unnecessary for MAC headers to be included to distinguish the origins of the different packets.

Figure 13:
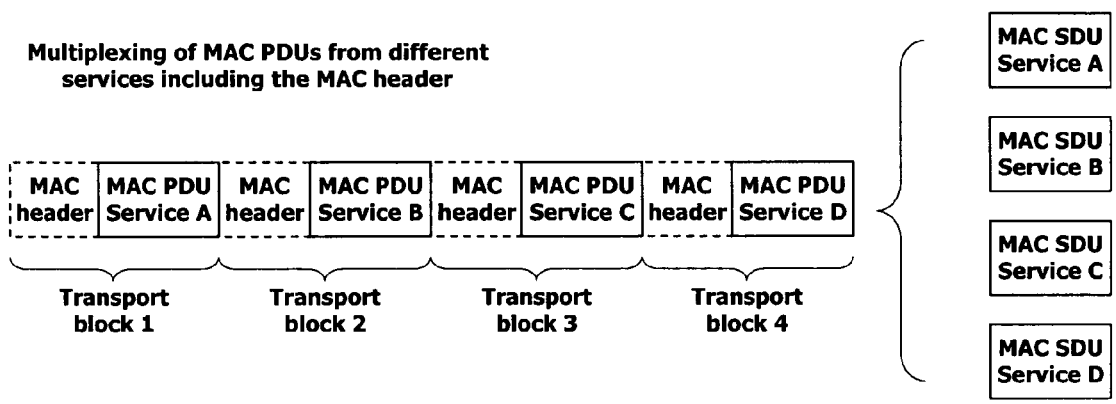
FIG. 13 illustrates an example of MAC multiplexing where different services are multiplexed onto the same transport channel.

FIG. 13 illustrates an example of MAC multiplexing where different services are multiplexed onto the same transport channel. This implies that for each PDU a MAC header must be included to indicate the services the packet is related to, and thus the size of the packet to be transported becomes larger.

Figure 14:
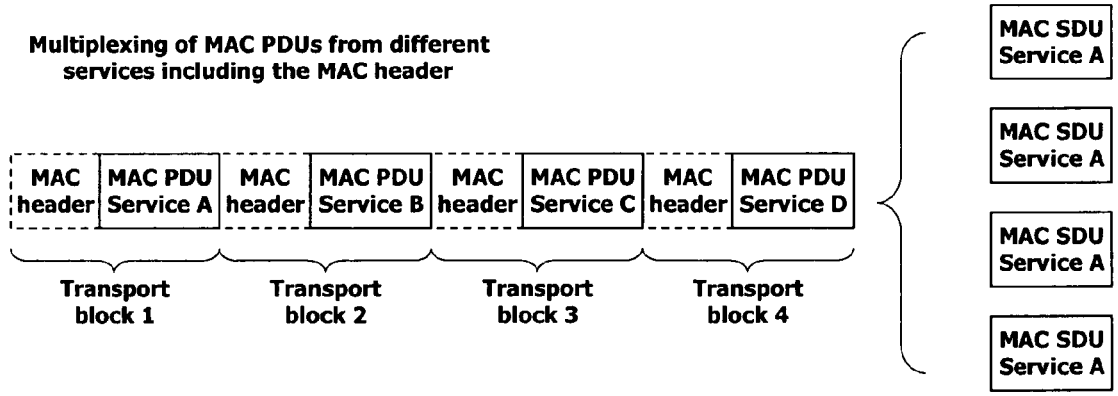
FIG. 14 illustrates an example of MAC multiplexing of one logical channel including a MAC header.

FIG. 14 illustrates and example of MAC multiplexing of one logical channel including a MAC header. Although it is not necessary in principle, it is possible that the MAC header would be included although only one service is multiplexed on the same transport channel.

Figure 15:
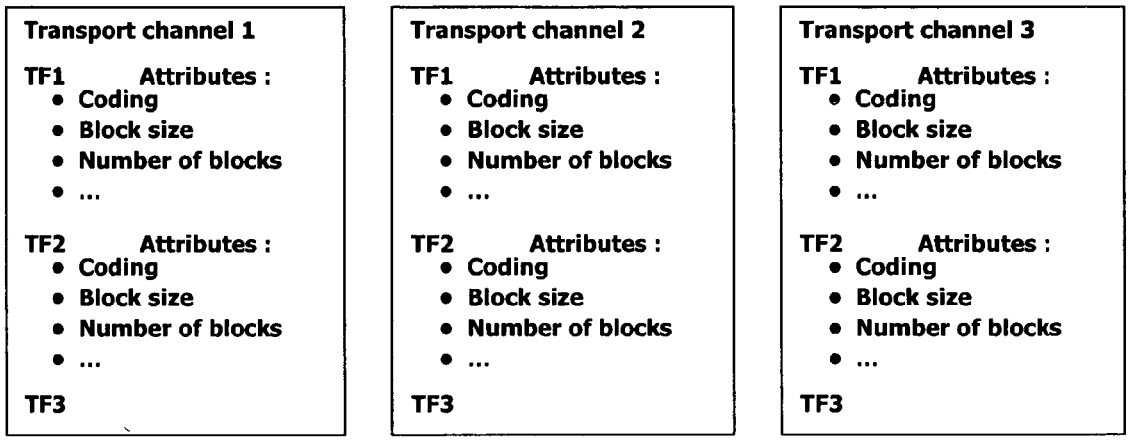
FIG. 15 illustrates different transport channel configurations.

For different streams with different QoS (e.g. delay, block error rate, etc.), different transport channels using specific mechanisms (e.g. TTI, coding, physical layer mechanisms) for fulfilling the QoS requirements will be used. Referring to FIG. 15, different transport channels are shown. For each of the transport channels, different transport formats are defined that allow to adapt to, for example, the amount of data that can be sent in one TTI and/or the number of blocks that can be sent.

Figure 16:
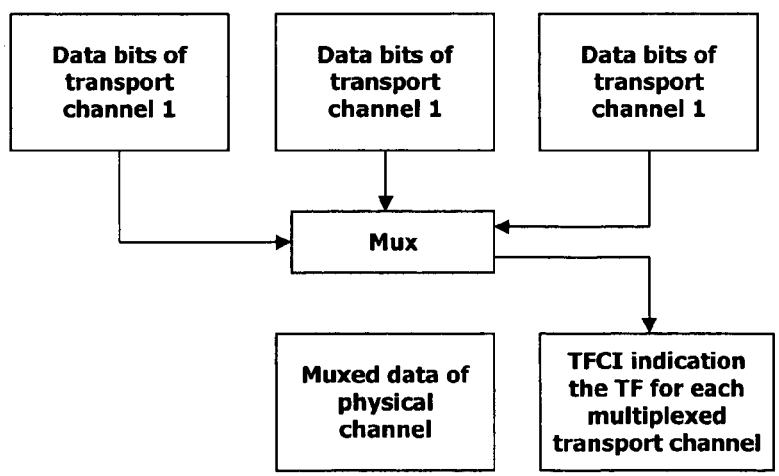
FIG. 16 illustrates different transport channels being multiplexed to a physical channel.

As shown in FIG. 16, different transport channels are multiplexed to a physical channel in a predefined scheme depending on the transport formats of the data coming from the different transport channels. In order to allow the data to be decoded, the combination of the transport channels multiplexed together must be signaled to the receiver. This is done using a TFCI (Transport Format Combination Indicator). One different TFCI value is assigned to each allowed TFC in the TFCS (Transport Format Combination Set), as shown in Table 1.

The TFCI value is sent in parallel to the transmitted data to allow the receiver to demultiplex the data in order to decode it correctly. As can be seen in Table 1, the possible combinations depend on the number of transport channels and the number of transport formats. Accordingly, when the number of transport channels changes, the number of transport formats also changes.

TABLE 1

| | Transport Format Combination Indicator | | | | |
|---|---|---|---|---|---|
| | Transport Format Combination Indicator (TFCI) | Transport Format Combination (TFC) | Transport Channel 1 | Transport Channel 2 | Transport Channel 3 |
| Transport Format Combination Set | 1 | TFC1 | TF1 | TF1 | TF1 |
| | 3 | TFC2 | TF1 | TF2 | TF1 |
| | 5 | TFC3 | TF1 | TF1 | TF2 |
| | 4 | TFC4 | TF2 | TF2 | TF2 |
| | 6 | TFC5 | TF3 | TF2 | TF2 |

TABLE 1-continued

| Transport Format Combination Indicator | | | | |
|---|---|---|---|---|
| Transport Format Combination Indicator (TFCI) | Transport Format Combination (TFC) | Transport Channel 1 | Transport Channel 2 | Transport Channel 3 |
| 10 | TFC6 | TF2 | TF3 | TF2 |
| 2 | TFC7 | TF3 | TF3 | TF2 |
| 7 | TFC8 | TF2 | TF1 | TF3 |

Figure 17:
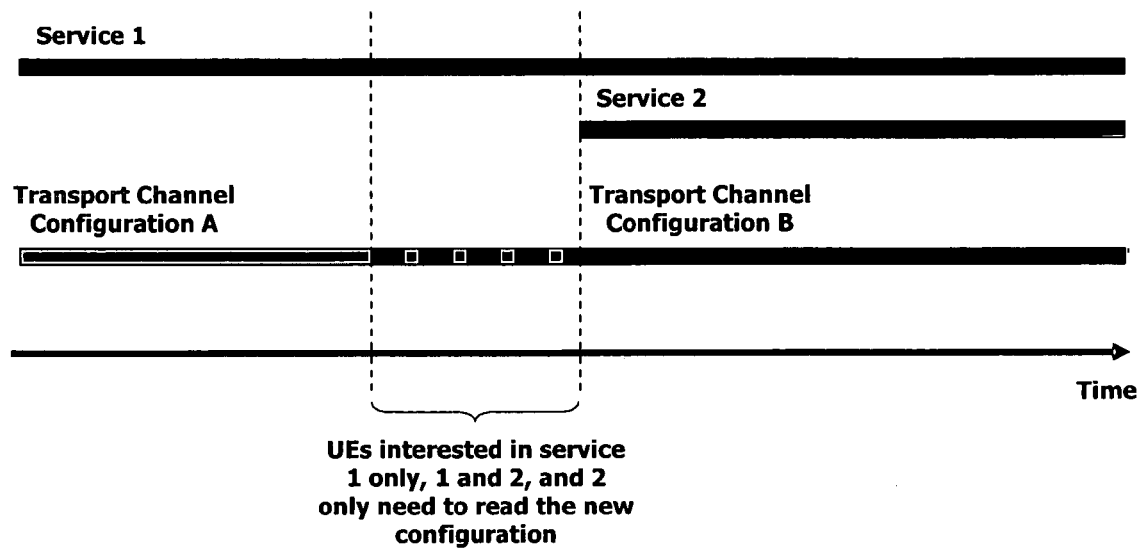
FIG. 17 illustrates the addition of a new transport channel for a new service, wherein the new transport channel is multiplexed onto a previously-used physical channel.

The above-stated scenario is shown in FIG. 17. As shown, a newly started service 2 is setup using a different transport channel and multiplexed on a physical channel already used by a service 1. However, by setting up a new transport channel, the TFCS and the TFCIs need to be changed. Consequently, all UEs that are only interested in the service 1 need to read the new configuration to be able to interpret the TFCI correctly.

The same principle applies when the service 2 is multiplexed together with the service 1 on the same transport channel. Initially, a MAC header is, in principle, not necessary when only one service is multiplexed onto one transport channel, as shown in FIG. 12. However, when another service is added, the MAC header becomes necessary. Accordingly, to be able to transport the same payload, the transport block size must be increased, thus making necessary a reconfiguration of the transport channel parameters. Similar to the case where multiplexing is done via separate transport channels, it is necessary for a UE that is only interested in service 1 to read the new configuration when the service 2 starts. This is so even if the UE is not interested in receiving the new service (service 2) at all.

Figure 18:
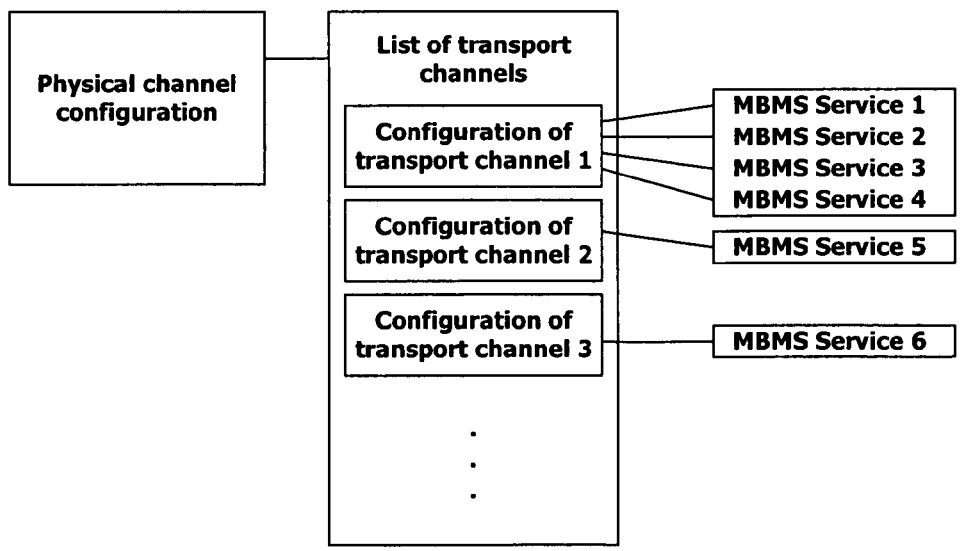
FIG. 18 illustrates a method for communicating a physical channel configuration.

A physical channel configuration is sent according to a scheme, as shown in FIG. 18. In FIG. 18, a physical channel configuration is given, including a list of transport channels that are mapped onto the physical channel. For each transport channel, a list of radio bearers (which is similar to the MBMS services) using the particular transport channel is configured. This principle is generally used to indicate the configuration of the current cell and the neighboring cell. Whether a MAC header is used or not is either defined in standard specifications, e.g. MAC header is always used/is never used for MTCH type of transport channels, or is used depending on whether one service is mapped (in which case the MAC header is not necessary) or whether it is never used.

Currently, it is not possible to include configurations of transport channels that do not carry an MBMS service in the physical channel configuration sent to the UE. Therefore, when a new service using such a transport channel begins, the UE must read the transport channel configuration and configuration information for the new service even if the UE is not interested in the new service. It is also not possible to indicate the use of a MAC header for multiplexing different services onto one transport channel when only one MBMS service originally uses the one transport channel (except for when it is decided that the MAC header is never used). Accordingly, when a new service is multiplexed onto a transport channel previously used by another service, the UE must read an additional transport channel configuration to account for the new service even if the UE is not interested in the new service.

Therefore, what is needed is a method that reduces the number of times the UEs read configuration information for services they are not interested in. In the prior art, it is not possible to indicate the configuration of transport channels on which no radio bearers (MBMS services) are mapped, neither in the configuration information of the current cell (MBMS Current Cell P-T-M RB Information) nor in the configuration information of the neighboring cell (MBMS Neighboring Cell P-T-M RB Information). Also, it is not possible to signal whether the MAC header for multiplexing different services is necessary or not. It is only possible to specify a rule wherein the MAC header is always/never present, or present depending on whether multiple logical channels are multiplexed onto the transport channel or not, for example. The present invention, therefore, overcomes all of these deficiencies.

Figure 19:
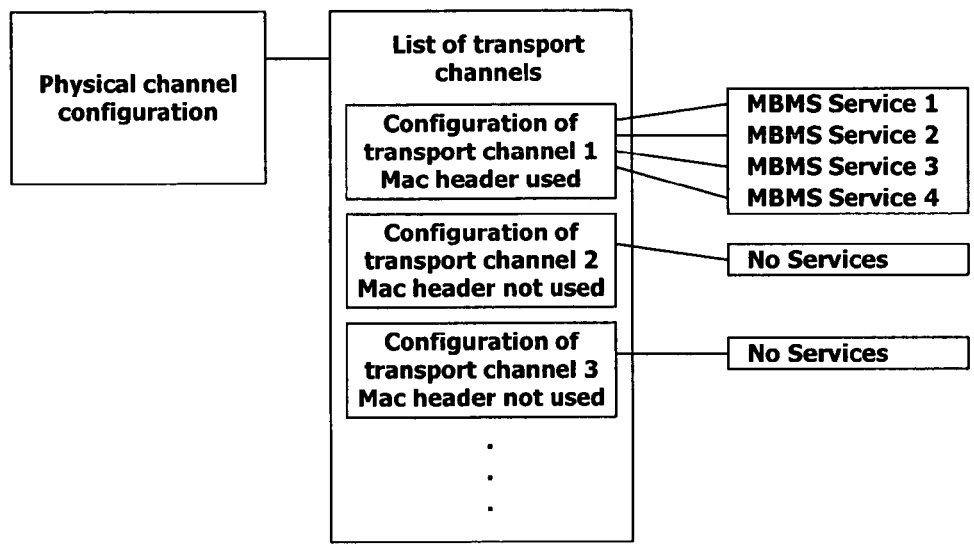
FIG. 19 illustrates a method for communicating transport channel configurations from a network to a UE in accordance with one embodiment of the present invention.

FIG. 19 illustrates a method for communicating transport channel configurations from a network to a UE in accordance with one embodiment of the present invention.

Referring to FIG. 19, a physical channel configuration is shown comprising a list of transport channels that are mapped onto the physical channel. As shown, configuration information for a transport channel 1 is included in the physical channel configuration and is configured according to a list of MBMS services using the transport channel 1. The physical channel configuration also comprises configuration information for a transport channel 2, wherein no MBMS services are mapped to the transport channel 2. Similarly, configuration information for a transport channel 3 is included in the physical channel configuration, wherein no MBMS services are mapped to the transport channel 3. Although three transport channel configurations are shown in FIG. 19, the present invention allows for more transport channel configurations to be included in the physical channel configuration. Preferably, the configurations of the physical channel and the transport channels indicate the configuration of a current cell and a neighboring cell.

Preferably, in order to configure a system where transport channels, having no MBMS services mapped to them, are included in a physical channel configuration sent to a UE, the UE is informed that no MBMS services are multiplexed onto such transport channels. The UE may also be informed that MBMS services being multiplexed onto such transport channels may optionally occur.

In operation, when the physical channel configuration is sent from the network to the UE, the UE not only learns of configuration information for transport channels currently having mapped MBMS services, but also learns of configuration information for transport channels currently having no mapped MBMS services. Preferably, the transport channels currently having no mapped MBMS services will potentially have new MBMS services mapped to them at the start of the new MBMS services. Thus, the UE may configure the transport channels for the new services prior to their start.

When the UE learns of new configuration information for new MBMS services which have not yet started, and which will be mapped on the already configured transport channels, the UE may determine to receive the new MBMS services before their start if the UE is interested in the services. Accordingly, at the start of the new MBMS services, which are mapped onto the transport channels previously having no mapped MBMS services, the UE reads the new configuration information if the UE is interested in the new MBMS services. If the UE is uninterested in the new MBMS services, then the UE need not read the new configuration information. Thus, the problem of the UE having to read configuration information for services the UE is not interested in is avoided.

Figure 20:
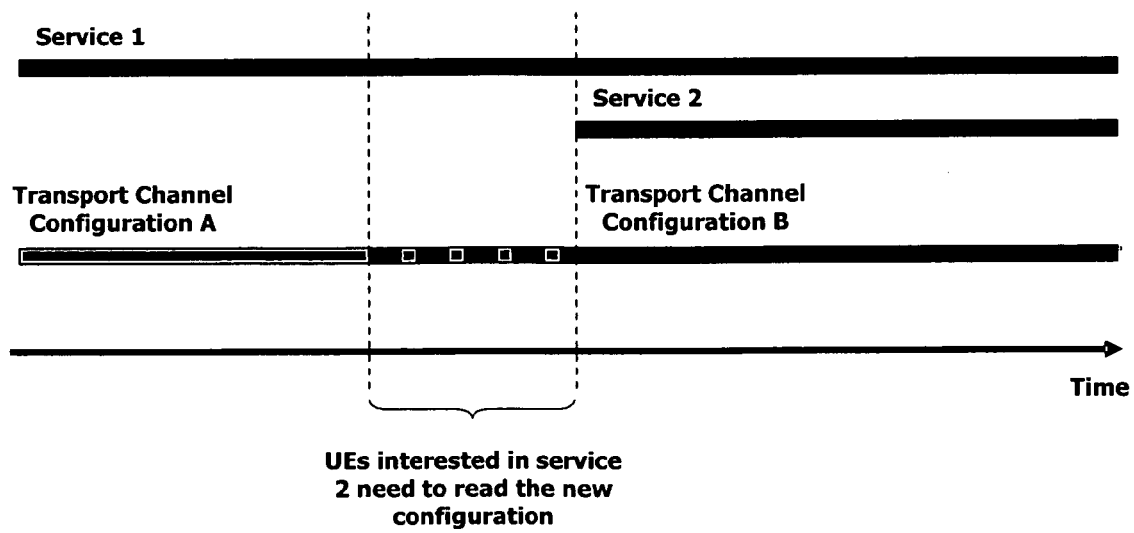
FIG. 20 illustrates the start of a new service being mapped onto a transport channel in accordance with one embodiment of the present invention.

FIG. 20 illustrates the start of a new service being mapped onto a transport channel in accordance with one embodiment of the present invention. As shown in FIG. 20, a newly started service 2 may be setup using the same transport channel configuration A multiplexed onto a physical channel currently being used by service 1 already including a transport channel on which no service was formerly sent. In accordance with the present invention, a UE will have already learned of the configuration information of the new service 2 before the start of the service 2. Accordingly, when the service 2 starts, the UE will read the configuration information if it is interested in the service 2. If the UE is not interested in the service 2, the UE will not read the configuration information for the service 2.

Referring back to FIG. 19, information for indicating whether a MAC header is used for multiplexing a number of MBMS services onto one transport channel may be included in the configuration information of a transport channel. As shown, for a transport channel 1, use of a MAC header is preferably signaled as a parameter of the transport channel 1. Conversely, for a transport channel 3 non-use of a MAC header is preferably signaled as parameter of the transport channel 3. Preferably, for a transport channel 2, use of a MAC header is preferably signaled as a parameter of the transport channel 2 even though no MBMS services are currently mapped to the transport channel.

In operation, when the physical channel configuration is sent from the network to the UE, the UE learns whether a MAC header is being used by a particular transport channel. Use of the MAC header indicates that at least two MBMS services may be multiplexed onto the same transport channel. Thus, upon receiving the configuration information for a transport channel, the UE may anticipate the transport channel being shared between different MBMS services although the transport channel currently has no MBMS services or only one MBMS service mapped to it.

Referring back to FIG. 20, a newly started service 2 may be setup using a transport channel configuration A and multiplexed onto a physical channel currently being used by service 1. Preferably, in accordance with one embodiment of the present invention, the newly started service 2 is mapped onto the same transport channel currently being used by the service 1. Preferably, a UE will have anticipated the new service 2 being mapped onto the same transport channel as the service 1 before the start of the service 2 via the existence of the MAC header for the service 1 in the configuration information for the currently used transport channel. Accordingly, when the service 2 starts, the UE will read the MAC header of the new service 2. If the UE is interested in the new service 2, the UE will read the configuration information for the service 2. If the UE is not interested in the new service 2, the UE will not read the configuration information for the service 2.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for managing channel configuration information in a wireless communication system having a network and a mobile terminal that support a multimedia broadcast multicast service (MBMS), the method comprising:
    receiving, in the mobile terminal, a physical channel configuration of a current cell the mobile terminal is located in to receive the MBMS service from the network; and
    receiving, in the mobile terminal, the MBMS service from the network using the received physical channel configuration,
    wherein the physical channel configuration comprises current cell configuration information of at least one transport channel on which no radio bearer is currently mapped and the at least one transport channel is capable of mapping to at least one radio bearer,
    wherein the current cell configuration information is related to current cell point-to-multipoint radio bearer information,
    wherein the physical channel configuration further comprises a list of transport channels that are mapped to a physical channel,
    wherein the physical channel configuration relates to a point-to-multipoint radio bearer configuration used in the current cell in case one or more MBMS services are provided using one or more point-to-multipoint radio bearers, and
    wherein each of the transport channels in the list is related to a list of radio bearers.

2. The method of claim 1, wherein the physical channel configuration is received periodically from the network.

3. A method for managing channel configuration information in a wireless communication system having a network and a mobile terminal that support a multimedia broadcast multicast service (MBMS), the method comprising:
    transmitting, from the network, a physical channel configuration of a current cell the mobile terminal is located in to provide the MBMS service to the mobile terminal; and
    transmitting, from the network, the MBMS service to the mobile terminal using the provided physical channel configuration,
    wherein the physical channel configuration comprises current cell configuration information of at least one transport channel on which no radio bearer is currently mapped and the at least one transport channel is capable of mapping to at least one radio bearer,
    wherein the current cell configuration information is related to current cell point-to-multipoint radio bearer information,
    wherein the physical channel configuration further comprises a list of transport channels that are mapped to a physical channel,
    wherein the physical channel configuration relates to a point-to-multipoint radio bearer configuration used in the current cell in case one or more MBMS services are provided using one or more point-to-multipoint radio bearers, and
    wherein each of the transport channels in the list is related to a list of radio bearers.

4. The method of claim 3, wherein the physical channel configuration is transmitted periodically to the mobile terminal.

5. The method of claim 3, further comprising:
    the network configuring the physical channel configuration before transmitting the physical channel configuration to the mobile terminal.

6. A mobile terminal for managing channel configuration information in a wireless communication system, the mobile terminal comprising:
    means for receiving a physical channel configuration of a current cell the mobile terminal is located in to receive a multimedia broadcast multicast service (MBMS) from a network; and
    means for receiving the MBMS service from the network using the received physical channel configuration,
    wherein the physical channel configuration comprises current cell configuration information of at least one transport channel on which no radio bearer is currently mapped and the at least one transport channel is capable of mapping to at least one radio bearer,
    wherein the current cell configuration information is related to current cell point-to-multipoint radio bearer information,
    wherein the physical channel configuration further comprises a list of transport channels that are mapped to a physical channel,
    wherein the physical channel configuration relates to a point-to-multipoint radio bearer configuration used in the current cell in case one or more MBMS services are provided using one or more point-to-multipoint radio bearers, and
    wherein each of the transport channels in the list is related to a list of radio bearers.

7. A network for managing channel configuration information in a wireless communication system, the network comprising:
    means for transmitting a physical channel configuration of a current cell a mobile terminal is located in to provide a multimedia broadcast multicast service (MBMS) to a mobile terminal; and means for transmitting the MBMS service to the mobile terminal using the provided physical channel configuration, wherein the physical channel configuration comprises current cell configuration information of at least one transport channel on which no radio bearer is currently mapped and the at least one transport channel is capable of mapping to at least one radio bearer, wherein the current cell configuration information is related to current cell point-to-multipoint radio bearer information, wherein the physical channel configuration further comprises a list of transport channels that are mapped to a physical channel, wherein the physical channel configuration relates to a point-to-multipoint radio bearer configuration used in the current cell in case one or more MBMS services are provided using one or more point-to-multipoint radio bearers, and wherein each of the transport channels in the list is related to a list of radio bearers.

8. A method for managing channel configuration information in a wireless communication system, the method comprising:

receiving transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service;

determining whether to receive the at least one new point-to-multipoint service; and reading configuration information for the at least one new point-to-multipoint service at the start of the at least one new point-to-multipoint service if it is determined that the at least one new point-to-multipoint service is to be received, wherein the configuration information for the at least one new point-to-multipoint service is not read if it is determined that the at least one new point-to-multipoint service is not to be received.

9. A method for managing channel configuration information in a wireless communication system, the method comprising:

transmitting to a mobile terminal transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service; and transmitting the at least one new point-to-multipoint service according to the transmitted transport channel configuration information, wherein the mobile terminal reads the configuration information for the at least one new point-to-multipoint service at the start of the at least one new point-to-multipoint service if the mobile terminal determines to receive the at least one new point-to-multipoint service, wherein the mobile terminal does not read the configuration information for the at least one new point-to-multipoint service if the mobile terminal determines not to receive the at least one new point-to-multipoint service.

10. A mobile terminal for managing channel configuration information in a wireless communication system, the mobile terminal comprising:

means for receiving transport channel configuration information for configuring at least one transport channel currently not mapping a point-to-multipoint service, wherein the at least one transport channel is capable of mapping at least one new point-to-multipoint service at the start or before the stop of the at least one new point-to-multipoint service;

means for determining whether to receive the at least one new point-to-multipoint service; and means for reading configuration information for the at least one new point-to-multipoint service at the start of the at least one new point-to-multipoint service if it is determined that the at least one new point-to-multipoint service is to be received, wherein the configuration information for the at least one new point-to-multipoint service is not read if it is determined that the at least one new point-to-multipoint service is not to be received.

11. A method for managing channel configuration information in a wireless communication system having a network and a mobile terminal that support a multimedia broadcast multicast service (MBMS), the method performed by the mobile terminal and comprising:

with respect to a current cell, receiving, from the network via a MBMS point-to-multipoint Control Channel (MCCH), a MBMS Current Cell P-T-M RB information message containing a list of transport channels and configuration information for at least one transport channel on which no radio bearer is currently mapped, but is capable of mapping to at least one radio bearer, and the configuration information relates to a point-to-multipoint radio bearer configuration used in the current cell in case one or more MBMS services are provided from the current cell using one or more point-to-multipoint radio bearers; and with respect to a neighboring cell, receiving, from the network via a MBMS point-to-multipoint Control Channel (MCCH), a MBMS Neighboring Cell P-T-M RB information message containing a list of transport channels and configuration information for at least one transport channel on which no radio bearer is currently mapped, but is capable of mapping to at least one radio bearer, and the configuration information relates to a point-to-multipoint radio bearer configuration used in the neighboring cell in case one or more MBMS services are provided from the neighboring cell using one or more point-to-multipoint radio bearers.

12. The method of claim 11, wherein at least one of the MBMS Current Cell P-T-M RB information message and the MBMS Neighboring Cell P-T-M RB information message is received periodically from the network.

13. The method of claim 12, wherein the at least one transport channel on which no radio bearer is currently mapped shall have new MBMS services mapped thereto at the start of the new MBMS service.

14. The method of claim 11, wherein the configuration information for the at least one new MBMS service is not read, if it is determined that the at least one new MBMS service is not to be received.

* * * * *